I. M. REAMES.
Fertilizers.

No. 135,846.  Patented Feb. 11, 1873.

Witnesses.
H L Perrine
Albert H Norris

Inventor.
Isaiah M. Reames
Per James L. Norris
Attorney

UNITED STATES PATENT OFFICE.

ISAIAH M. REAMES, OF OXFORD, NORTH CAROLINA.

IMPROVEMENT IN MACHINES FOR DISTRIBUTING FERTILIZERS.

Specification forming part of Letters Patent No. 135,846, dated February 11, 1873.

*To all whom it may concern:*

Be it known that I, ISAIAH M. REAMES, of Oxford, Granville county, North Carolina, have invented certain Improvements in Machines for Distributing Fertilizers, Grain, &c., of which the following is a specification:

This invention has for its object to furnish a machine for distributing pulverized or solid fertilizing substances and grain, which shall be simple in construction and effective in operation. The invention consists in the provision of a pair of cylinders or shafts, possessing spiral conveyer-flanges, and arranged within a hopper or box, which is divided into two compartments, said conveyer-shafts being so arranged in relation to feeding and discharging openings that the fertilizers are conveyed from the upper compartment, which receives the bulk of the material, into the lower compartment, in which is arranged the second conveyer-shaft for delivering the fertilizers into a discharge-tube extending to or near the ground.

Figure 1:
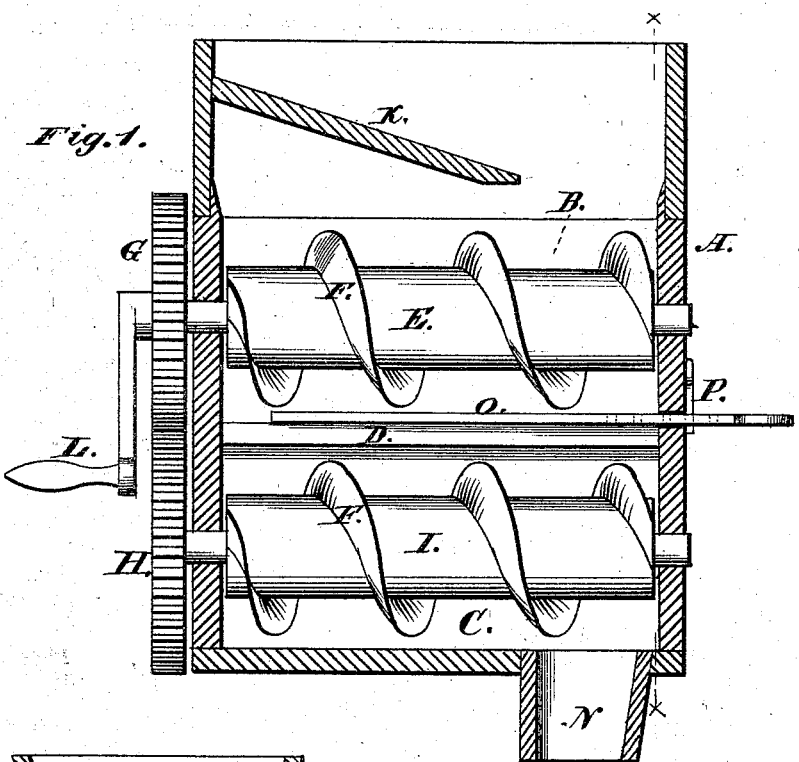
Figure 2:
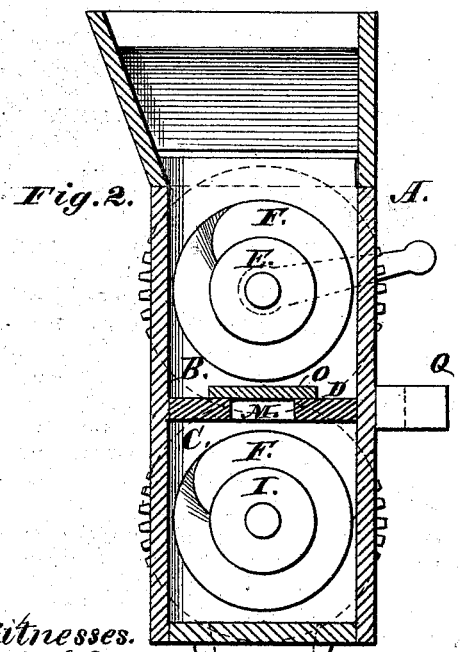
Figure 3:
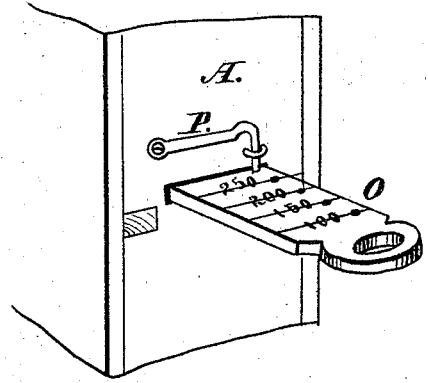

In the drawing, Figure 1 is a vertical longitudinal sectional view of my invention. Fig. 2 is a transverse section taken through the line *x x*, Fig. 1. Fig. 3 is a detail view of a portion of the hopper and graduated slide.

A designates the box or hopper for receiving the fertilizing material and the distributing mechanism, the same being of any desired form and dimensions. The hopper is divided into two superposed compartments or chambers, B C, by means of a partition-plate D, which covers the entire horizontal internal area of the hopper, it being secured to the sides and ends of the same. In the upper compartment B, which receives the bulk of the material to be distributed, is arranged a revolving-shaft or cylinder E, carrying spirally-turned flanges or wings F, and journaled in the end-panels of the hopper, as shown. The end or bearing of the shaft carries a spur-wheel, G, which meshes into a corresponding spur-wheel, H, applied to the end of a lower cylinder or conveyer-shaft, I, as shown. Said shaft is arranged in the lower compartment C of the hopper or box, and is provided with spiral flanges F, the same as on the upper cylinder. The pulverized fertilizing material, grain, or seed to be distributed is fed into the upper compartment at the end removed from the discharge-opening in the division-plate, by an inclined apron or chute, K. Rotary motion is imparted to the upper cylinder by a crank, L, applied to its end, and the same is transmitted to the lower conveyer, but in a reverse direction, through the medium of the gearing, as described. The function of the upper conveyer-shaft is to convey the fertilizers or other materials to the delivery-slot M or opening in the division-plate, through which it passes into the lower compartment, where it is conveyed and delivered into a discharge-opening or spout, N, to which is attached a conducting-tube extending to or near the ground.

The operation of the parts above described will permit a regular and uniform distribution of fertilizers or grain, as the bulk of the same is contained within a separate compartment, and delivered in measured quantities into a second compartment, which possesses a conveyer-shaft for delivering it into the discharge-tube.

For regulating the flow or passage of the materials from the upper compartment into the lower, an adjustable slide, O, is arranged in relation to the discharge-opening or slot in the division-plate, so that the size of said opening can be varied for accomplishing the desired result. A scale of figures is provided on the end of said slide for determining the quantity of the material to be distributed on a given area of ground. For maintaining the slide O in its various adjusted positions, I provide a hook, P, spring-catch, or other suitable device.

In the present instance I have shown the machine adapted to be connected to the person of the operator, a curved breast-plate, Q, and suitable suspension-straps being provided for supporting it in position. I do not, however, confine myself to such a portable arrangement of parts, as the device may be mounted in a suitable carriage, and be operated by suitable gearing connected with the transporting-wheels thereof.

I claim as my invention—

The combination of the spirally-flanged conveyer-shafts E I revolving in opposite directions and arranged in the receiving and discharging compartments B C of a fertilizer or seed-planter, as herein shown and described.

ISAIAH M. REAMES.

Witnesses:
THOMAS G. CREWS,
SIMEON TIPPETT.